United States Patent
Koyama et al.

(10) Patent No.: US 10,768,383 B2
(45) Date of Patent: Sep. 8, 2020

(54) OPTICAL AXIS ADJUSTMENT METHOD, MANUFACTURING METHOD, AND OPTICAL AXIS ADJUSTMENT DEVICE FOR INTEGRATED OPTICAL MODULE

(71) Applicant: Mitsubishi Electric Corporation, Tokyo (JP)

(72) Inventors: Daichi Koyama, Tokyo (JP); Hidekazu Kodera, Isahaya (JP); Yoshiya Sato, Tokyo (JP); Tadayoshi Hata, Tokyo (JP); Masaya Shimono, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/336,621

(22) PCT Filed: Nov. 10, 2017

(86) PCT No.: PCT/JP2017/040633
§ 371 (c)(1),
(2) Date: Mar. 26, 2019

(87) PCT Pub. No.: WO2018/088537
PCT Pub. Date: May 17, 2018

(65) Prior Publication Data
US 2020/0183101 A1 Jun. 11, 2020

(30) Foreign Application Priority Data
Nov. 10, 2016 (JP) .................................. 2016-219882

(51) Int. Cl.
*G02B 6/42* (2006.01)
*G02B 6/293* (2006.01)
(Continued)

(52) U.S. Cl.
CPC ......... *G02B 6/4225* (2013.01); *G02B 6/2938* (2013.01); *G02B 6/4215* (2013.01);
(Continued)

(58) Field of Classification Search
CPC ... G02B 6/4225; G02B 6/2938; G02B 6/4215
See application file for complete search history.

(56) References Cited

U.S. PATENT DOCUMENTS 7,072,540 B1 * 7/2006 Szapiel .............. G02B 6/29365
385/14
2002/0154313 A1 * 10/2002 Zhou ................. G02B 6/29395
359/577

(Continued)

FOREIGN PATENT DOCUMENTS

JP 2007241226 A 9/2007
JP 2011114129 A 6/2011
(Continued)

OTHER PUBLICATIONS

Office Action dated Aug. 27, 2019, issued in the corresponding Japanese Patent Application No. JP 2018-550287, 7 pages including 4 pages of English translation.
(Continued)

*Primary Examiner* — Sung H Pak
(74) *Attorney, Agent, or Firm* — Buchanan Ingersoll & Rooney PC (57) ABSTRACT

An optical axis adjustment method for an integrated optical module includes: measuring output currents by changing a wavelength of a light beam incident on a package; detecting, with first and second light receiving elements, light beams resulted from demultiplexing the incident light beam with first and second filters; detecting center wavelengths of a first light beam and a second light beam based on a change in the output currents in response to a change in the
(Continued)

wavelength of the incident light beam; comparing the center wavelengths of the first light beam and the second light beam with design transmission wavelengths of the first filter and the second filter, and defining respective differences as a first wavelength deviation and a second wavelength deviation; and adjusting a position of the optical demultiplexer to make a total sum of the first wavelength deviation and the second wavelength deviation small.

11 Claims, 10 Drawing Sheets

(51) Int. Cl.
    *H04B 10/25* (2013.01)
    *H04B 10/27* (2013.01)

(52) U.S. Cl.
    CPC ............ *G02B 6/4239* (2013.01); *H04B 10/25* (2013.01); *H04B 10/27* (2013.01)

(56) References Cited

U.S. PATENT DOCUMENTS

| | | | | |
|---|---|---|---|---|
| 2003/0099434 A1* | 5/2003 | Liu | ................... | G02B 6/2938 385/31 |
| 2007/0211993 A1 | 9/2007 | Hashizume et al. | | |
| 2008/0013955 A1 | 1/2008 | Takano et al. | | |
| 2008/0043311 A1* | 2/2008 | Liu | ................... | G02B 27/283 359/226.1 |
| 2009/0097849 A1* | 4/2009 | Childers | ................ | H04J 14/02 398/79 |
| 2011/0122898 A1 | 5/2011 | Ikeda et al. | | |
| 2014/0376929 A1 | 12/2014 | Takechi | | |
| 2015/0365175 A1 | 12/2015 | Kawamura et al. | | |
| 2015/0365176 A1 | 12/2015 | Kawamura et al. | | |

FOREIGN PATENT DOCUMENTS

| | | |
|---|---|---|
| JP | 2012118113 A | 6/2012 |
| JP | 2015007670 A | 1/2015 |
| JP | 2016018016 A | 2/2016 |
| WO | 2006006197 A1 | 1/2006 |

OTHER PUBLICATIONS

International Search Report (with English translation) and Written Opinion issued in corresponding International Patent Application No. PCT/PCT/JP2017/040633, 9 pages (dated Jan. 30, 2018).

\* cited by examiner

VERTICAL ANGLE DEVIATION BETWEEN LIGHT BEAM FROM FIBER AND OPTICAL DEMULTIPLEXER [deg]

OPTICAL AXIS ADJUSTMENT METHOD, MANUFACTURING METHOD, AND OPTICAL AXIS ADJUSTMENT DEVICE FOR INTEGRATED OPTICAL MODULE

TECHNICAL FIELD

The present invention relates to an optical axis adjustment method, a manufacturing method, and an optical axis adjustment device for an integrated optical module, and, more particularly, to an optical axis adjustment method for an optical demultiplexer that demultiplexes an incident light beam into a plurality of light beams having different wavelengths, a manufacturing method for an integrated optical module including the optical demultiplexer, and an optical axis adjustment device.

BACKGROUND ART

In recent years, the communication speed of optical communication has been increasing, which requires an optical communication module that is higher in communication speed, smaller in size, and lower in power consumption. Therefore, an integrated optical communication module (hereinafter, referred to as "integrated optical module") that is small in size and high in communication speed has been developed. In such an integrated optical module, a plurality of light receiving elements is mounted, a wavelength-multiplexed light beam output from one fiber is demultiplexed into a plurality of light beams having different wavelengths to cause the light receiving elements to receive the light beams, and an optical signal is converted into an electric signal by each of the light receiving elements.

For the conventional optical communication module, one light receiving element is provided for one optical communication module, and optical axis adjustment of a light beam output from an optical fiber is performed for the one light receiving element, and the optical communication module and the optical fiber are fixed at a position where a current value of an electric signal resulted from converting an optical signal in the light receiving element becomes optimum. On the other hand, optical axis adjustment is required for the integrated optical module to achieve a configuration where a plurality of light receiving elements is mounted in one integrated optical module, and a wavelength-multiplexed light beam output from an optical fiber is demultiplexed into a plurality of light beams having different wavelengths to cause each of the light receiving elements to receive a corresponding one of the plurality of light beams. Therefore, the optical axis adjustment needs to be performed by the number of light receiving elements mounted in the integrated optical module.

On the other hand, in the method described in Patent Document 1, an optical demultiplexer that includes a plurality of wavelength filters and demultiplexes an incident optical signal into a plurality of signal light beams having different wavelengths is prepared, a position of the optical demultiplexer is determined based on a difference between a reference angle and a design angle with reference to an angle perpendicular to an optical axis of an external light source for optical axis adjustment, then an optical signal received by each light receiving element is measured, and the position of the optical demultiplexer is fine-adjusted.

PRIOR ART DOCUMENT

Patent Document

Patent Document 1: JP 2016-18016 A

SUMMARY OF THE INVENTION

Problems to be Solved by the Invention

However, even when the optical axis of a light beam passing through one of the wavelength filters is adjusted, depending on accuracy with which the wavelength filters of the optical demultiplexer are mounted or the like, the optical axis of a light beam passing through another wavelength filter may deviate, requiring for the optical axis adjustment to be repeated by the number of light receiving elements to optimize the position of the optical demultiplexer, which increases the number of times of the optical axis adjustment and increases an assembly time of an optical component.

In view of the above, it is an object of the present invention to provide an optical axis adjustment method, a manufacturing method, and an optical axis adjustment device for an integrated optical module that allow optical axis adjustment to be performed the smaller number of times with high accuracy.

Means for Solving the Problems

The present invention provides an optical axis adjustment method for an integrated optical module including, in a package, an optical demultiplexer that demultiplexes an incident light beam into a first light beam and a second light beam, and a first light receiving element and a second light receiving element that receive the first light beam and the second light beam, respectively, the first light beam being suitable for a wavelength band of a light beam to be received by the first light receiving element, the second light beam being suitable for a wavelength band of a light beam to be received by the second light receiving element, the optical axis adjustment method including steps of: preparing the package including the first light receiving element and the second light receiving element; detecting a position where a first filter is perpendicular to the incident light beam and disposing, in the package, the optical demultiplexer including the first filter and a second filter at a design angle based on an angle of the position; measuring output currents by changing a wavelength of the incident light beam introduced into the package and detecting, with the first light receiving element and the second light receiving element, light beams resulted from demultiplexing the incident light beam with the first filter and the second filter; detecting center wavelengths of the first light beam and the second light beam based on a change in the output currents in response to a change in the wavelength of the incident light beam; comparing the center wavelengths of the first light beam and the second light beam with design transmission wavelengths of the first filter and the second filter, and defining respective differences as a first wavelength deviation and a second wavelength deviation; and adjusting a position of the optical demultiplexer to make a total sum of the first wavelength deviation and the second wavelength deviation small. Here, a description is given of the first light receiving element and the second light receiving element, but the optical axis adjustment method is applicable to third and subsequent light receiving elements; thus, the number of light receiving elements is not limited to this number. The optical axis adjustment is achieved by, regardless of the number of light receiving elements, comparing a pair of a center wavelength of a light beam and a design transmission wavelength of a filter and making a wavelength deviation small.

The present invention further provides a manufacturing method for an integrated optical module including a step of, after the optical axis adjustment, bonding the optical demultiplexer to the package at a position where the optical axis adjustment has been performed.

The present invention further provides an optical axis adjustment device for an integrated optical module including, in a package, an optical demultiplexer that demultiplexes an incident light beam into a first light beam and a second light beam that have different wavelengths and a first light receiving element and a second light receiving element that receive the first light beam and the second light beam, respectively, the optical axis adjustment device including: a stage on which the package with the first light receiving element and the second light receiving element mounted in the package is placed and fixed; a gripping means that grips, into the package, the optical demultiplexer including a first filter and a second filter; a light source that supplies the incident light beam; a reflected return light measurement device that detects a light beam corresponding to the incident light beam reflected by the first filter; a current measurement instrument that detects the first light beam and the second light beam with the first light receiving element and the second light receiving element and acquires output currents from the light beams detected; and a PC unit that detects center wavelengths of the first light beam and the second light beam based on a wavelength of the incident light beam and the output currents, compares the center wavelengths of the first light beam and the second light beam with design transmission wavelengths of the first filter and the second filter, defines respective differences as a first wavelength deviation and a second wavelength deviation, and calculates a position of the optical demultiplexer to make a total sum of the first wavelength deviation and the second wavelength deviation small. The gripping means moves the optical demultiplexer based on a calculation result of the PC unit. Here, a description is given of the first light receiving element and the second light receiving element, but the optical axis adjustment method is applicable to third and subsequent light receiving elements; thus, the number of light receiving elements is not limited to this number. Optical axis adjustment where only the first wavelength deviation becomes small or optical axis adjustment where the total sum additionally including the third and subsequent wavelength deviations becomes small are also possible.

Effects of the Invention

The optical axis adjustment method for an integrated optical module according to the present invention makes it possible to perform optical axis adjustment where the output current values of the light receiving elements are measured and the combination of the output current values becomes optimum. Therefore, it is possible to reduce the number of times of the optical axis adjustment and to perform the optical axis adjustment with high accuracy.

EMBODIMENTS OF THE INVENTION

First Embodiment

Figure 1:
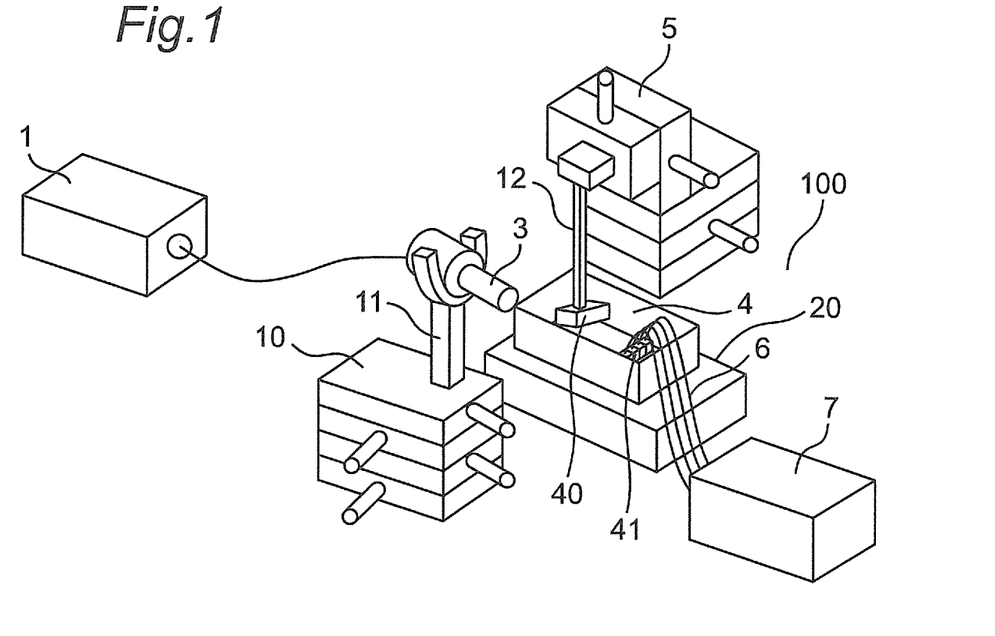
FIG. 1 is a perspective view of an optical axis adjustment device according to a first embodiment of the present invention.
Figure 2:
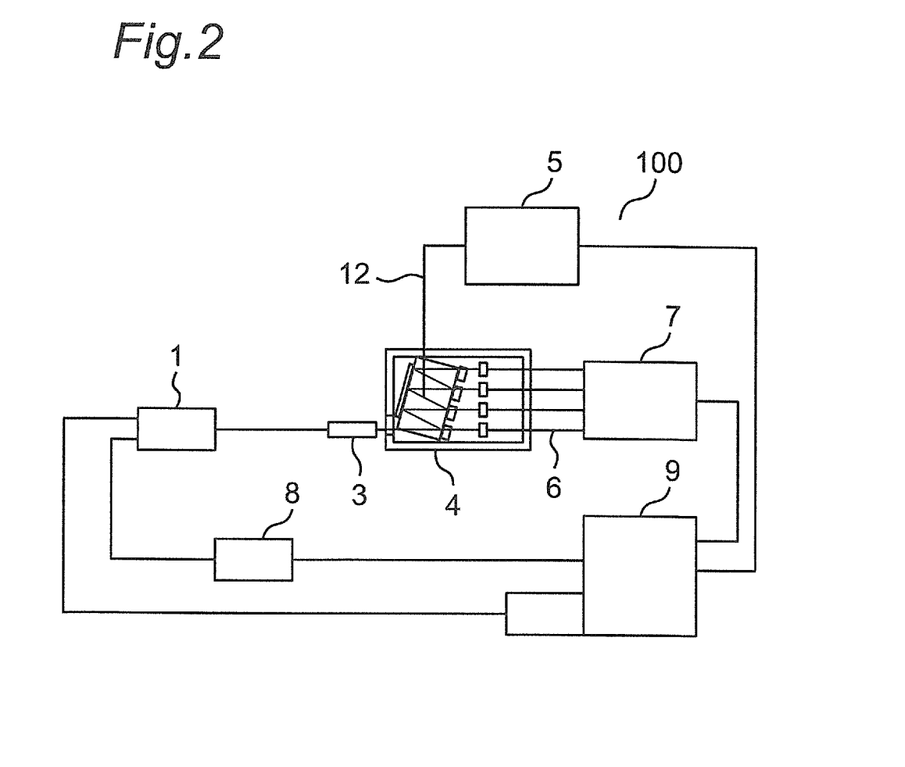
FIG. 2 is a block diagram showing a configuration of the optical axis adjustment device according to the first embodiment of the present invention.

FIG. 1 is a perspective view of an optical axis adjustment device according to a first embodiment of the present invention, the whole of which is denoted by 100. Further, FIG. 2 is a block diagram showing a configuration of the optical axis adjustment device 100. In FIGS. 1 and 2, the same reference numerals indicate the same or similar parts.

As shown in FIG. 1, the optical axis adjustment device 100 includes a stage 20 and adjustment mechanisms 5, 10 that adjust a position and angle. The stage 20 is made of, for example, a metal plate having a flat upper surface, on which an integrated optical module 4 to be subjected to optical axis adjustment is placed and fixed.

The adjustment mechanism 5 includes a gripping means 12 that grips an optical demultiplexer 40 mounted in the integrated optical module 4. The adjustment mechanism 5 is capable of traveling in X axis, Y axis, and Z axis directions orthogonal to each other and rotating about the X axis, the Y axis, and the Z axis, and adjusts, with the capabilities, a position and angle of the optical demultiplexer 40 gripped by the gripping means 12.

The adjustment mechanism 10 includes a gripping means 11 that grips a collimator 3. The adjustment mechanism 10 is also capable of traveling in the X axis, the Y axis, and the Z axis directions orthogonal to each other and rotating about the X axis, the Y axis, and the Z axis, and adjust, with the capabilities, a position and angle of the collimator 3 gripped by the gripping means 11.

A light source 1 is connected to the collimator 3 via an optical fiber and supplies a light beam for optical axis adjustment. The light beam supplied from the light source 1 is converted into a parallel light beam by the collimator 3.

A current measurement instrument 7 is connected by a wire 6 to a light receiving element 41 mounted in the integrated optical module 4 and detects an output current resulted from converting an incident light beam in the light receiving element 41.

As shown in FIG. 2, the optical axis adjustment device 100 includes a PC unit 9 and stores wavelength data to be sent to the light source 1 and current data measured by the current measurement instrument 7.

Figure 3:
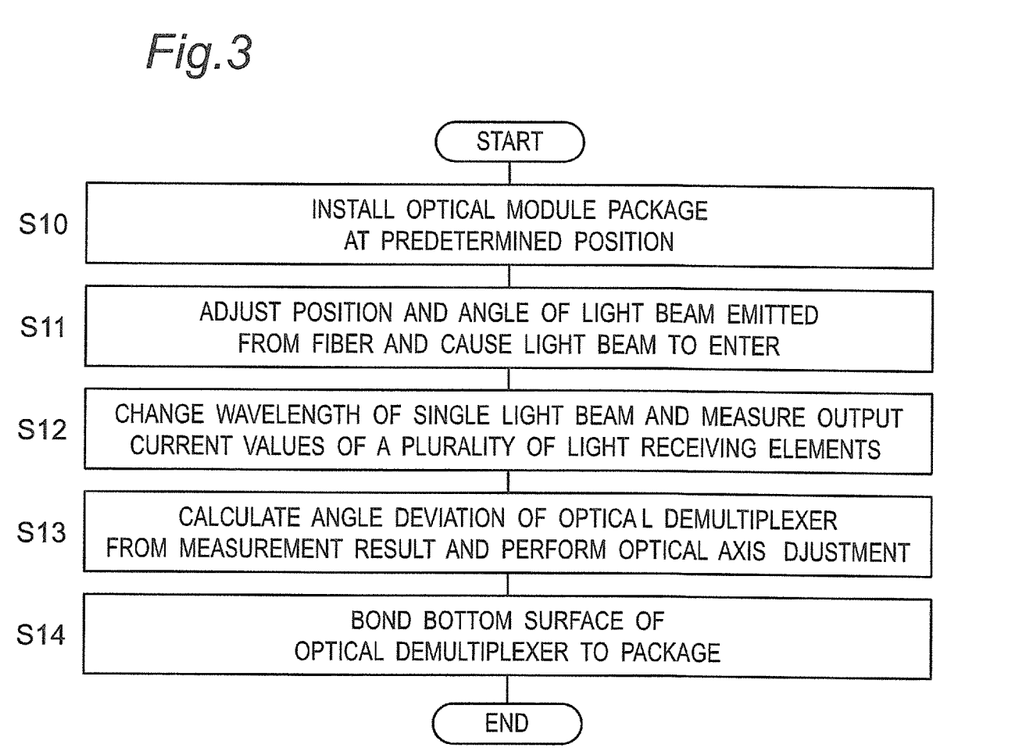
FIG. 3 is a flowchart showing an optical axis adjustment method for an integrated optical module according to the first embodiment of the present invention.

Next, an optical axis adjustment method will be described with reference to FIG. 3. FIG. 3 is a flowchart showing the optical axis adjustment method according to the first embodiment of the present invention, and the optical axis adjustment method includes the following five steps S10 to S14.

[Step S10]

Figure 4:
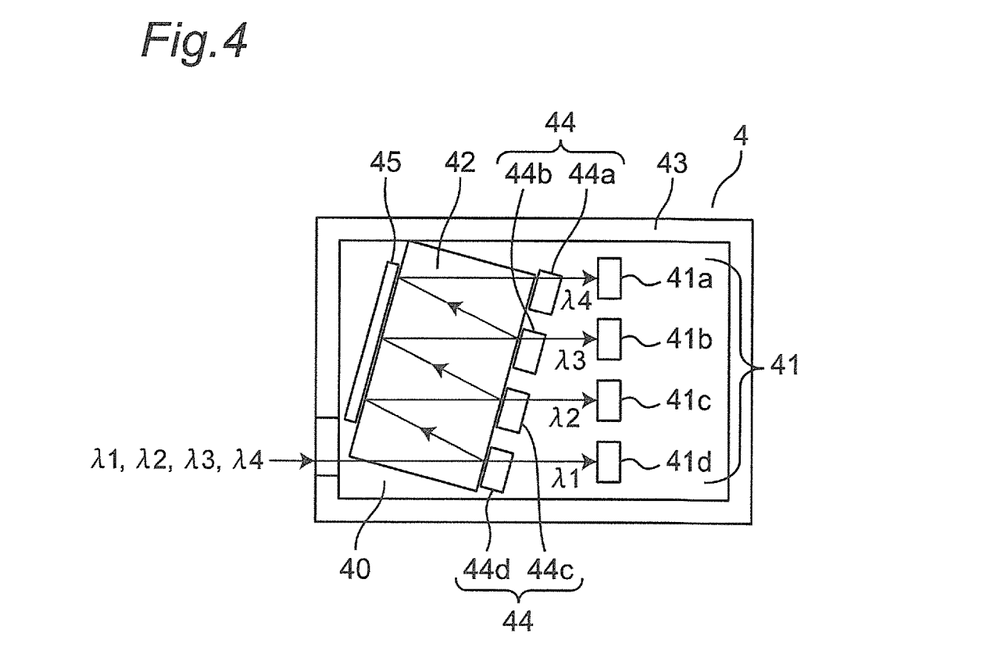
FIG. 4 is a plan view of the integrated optical module under optical axis adjustment according to the first embodiment of the present invention.

A package 43 of the integrated optical module 4 is fixed at a predetermined position on the stage 20 that is flat. As shown in FIG. 4, the integrated optical module 4 includes the package 43 serving as a housing, a plurality of the light receiving elements 41 mounted in the package 43, and the optical demultiplexer 40 that demultiplexes an incident light beam into a plurality of light beams having different wavelengths. FIG. 4 shows a configuration where four light receiving elements 41 are provided, but the number of light receiving elements 41 is not limited to four.

At this point, the light receiving elements 41 is fixed to the package 43, but the optical demultiplexer 40 is not fixed to the package 43 but is gripped by the gripping means 12 of the adjustment mechanism 5.

The optical demultiplexer 40 includes a main body 42 that is made of, for example, glass and is thus transparent, and a filter (transparent optical component) 44 and a reflector 45 that are arranged, in parallel with each other, on opposite sides of the main body 42. The filter 44 serves as an optical filter that transmits only a light beam in a specific wavelength band in accordance with an incident light angle and reflects a light beam in other wavelength bands, and demultiplexes an incident light beam into a plurality of light beams having different wavelengths. The number of filters 44 mounted is the same as the number of light receiving elements 41. In FIG. 4, four filters 44a, 44b, 44c, and 44d are provided and are configured to transmit a light beam in their respective different wavelength bands when the light beam is incident at the same incident angle. This configuration allows a wavelength-multiplexed light beam that has entered the integrated optical module 4 to be demultiplexed into four light beams having different wavelengths and then allows the four light beams to enter the four light receiving elements 41.

For example, at a predetermined incident angle, a wavelength band of a light beam passing through the filter 44a is 1293.5 nm to 1297.5 nm. Further, at the same incident angle, wavelength bands of light beams passing through the filter 44b, the filter 44c, and the filter 44d are 1298.0 nm to 1302.0 nm, 1302.5 nm to 1306.5 nm, and 1307.0 nm to 1311.0 nm, respectively. The filters 44a to 44d do not transmit but reflect light beams having wavelengths other than the above-described wavelengths.

Further, a center value of each of the transmission wavelength bands shifts by 0.7 nm when the incident angle changes by 1.0 degree. Specifically, on the assumption that the center value of the transmission wavelength band of the filter 44a is 1295.5 nm at a certain incident angle of $\alpha$ degree, when the incident angle changes by $\alpha$+1.0 degrees, the center value of the transmission wavelength band shifts from 1295.5 nm to 1296.2 nm. Further, the transmission wavelength band shifts, as a whole, to a longer wavelength band of 1294.2 nm to 1298.2 nm. At this time, there arises a problem that the filter 44a adjacent to the filter 44b transmits a light beam having a wavelength of 1298.0 nm to 1298.2 nm that should originally be transmitted through the filter 44b. In addition, there arises another problem that a deviation in reflection angle deviates an optical path. Therefore, high accuracy is required for optical axis adjustment of the optical demultiplexer 40.

The wire 6 is connected to each of the four light receiving elements 41, and the output current values of the light receiving elements 41 are measured by the current measurement instrument 7.

[Step S11]

The light beam supplied from the light source 1 is caused to enter the collimator 3 via the optical fiber. The collimator 3 is gripped by the gripping means 11. The position and angle of the collimator 3 are adjusted by the adjustment mechanism 10. For example, the position and angle of the collimator 3 are adjusted so that, in FIG. 4, the output current value of the light receiving element 41d that receives a light beam passing through the filter 44d is largest. The light beam supplied from the light source passes through the collimator 3 gripped at a predetermined position and angle by the gripping means 11 and enters into the package 43 of the integrated optical module 4.

[Step S12]

The position and angle of the optical demultiplexer 40 gripped by the gripping means 12 are adjusted by the adjustment mechanism 5 so that the incident light beam that has entered into the package 43 through the collimator 3 enters the optical demultiplexer 40. Such adjustment determines the position and angle of the optical demultiplexer 40 except for a rotation angle in a horizontal direction.

Next, in this state, the wavelength of the light beam emitted from the light source 1 is changed, and the light beam that has entered the light receiving element 41 through the optical demultiplexer 40 is detected. For example, as shown in FIG. 4, when the wavelength of the incident light beam is λ1, the incident light beam passes through only the filter 44d but not through the other filters 44a to 44c, and enters the light receiving element 41d and is detected. When the wavelength of the incident light beam is λ2, the incident light beam is reflected by the filter 44d, further reflected by the reflector 45, passes through the filter 44c, and enters the light receiving element 41c and is detected. Similarly, an incident light beam having a wavelength λ3 and an incident light beam having a wavelength λ4 pass through the filter 44b and the filter 44a and are detected by the light receiving element 41b and the light receiving element 41a, respectively.

Figure 5:
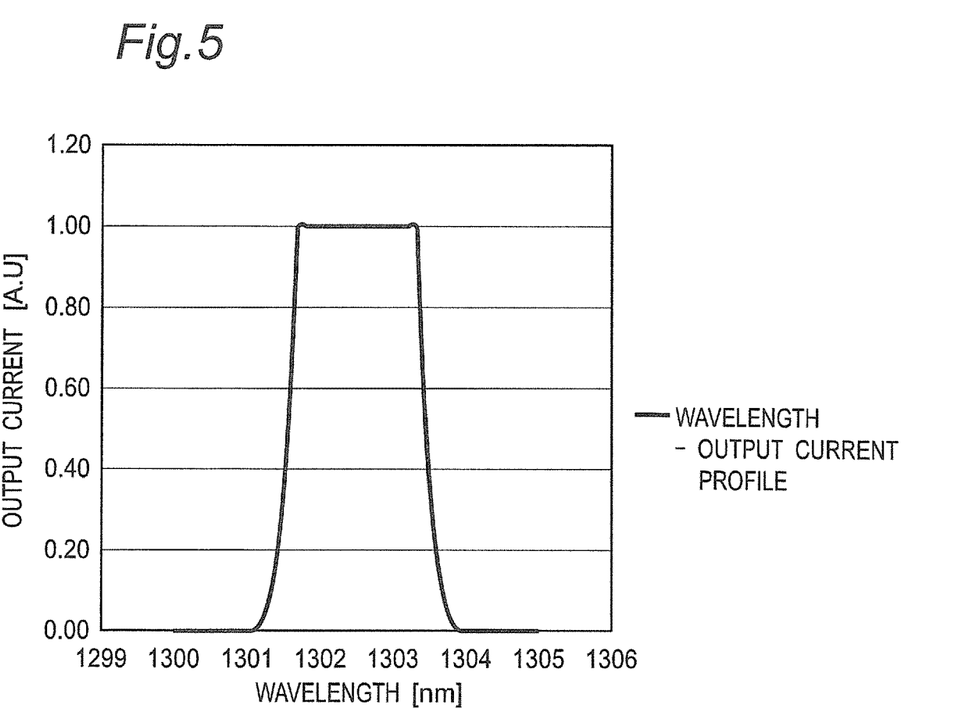
FIG. 5 is a graph showing changes in an output current of a light receiving element according to the first embodiment of the present invention when a wavelength of a light beam is changed.

FIG. 5 is a graph showing a change in the output current of the light receiving element when the wavelength of the light beam is changed, in which a horizontal axis represents the wavelength of the received light beam, and a vertical axis represents the output current. A relation between the wavelength of the received light beam and the output current is represented by a convex profile as shown in FIG. 5, and this profile is referred to as an output current profile.

The light beam to be received by the light receiving element 41 is a light beam that has passed through a corresponding filter 44 located in front of the light receiving element 41. The filter 44 mounted in the main body 42 of the optical demultiplexer 40 transmits only a light beam in a specific wavelength band at a specific incident angle and reflects a light beam in the other wavelength bands. Therefore, changing the wavelength changes a quantity of light beam passing through the filter 44 and changes a band of a light beam to be received by the light receiving element 41. The light beam that has passed through the filter 44 is received by the light receiving element 41, measured as an output current by the current measurement instrument 7, and acquired by the PC unit 9 as output current value data.

Further, the wavelength of the light beam supplied from the light source 1 is measured by a measurement instrument 8 and acquired by the PC unit 9 as wavelength data. As a result, an output current profile as shown in FIG. 5 can be output by the PC unit 9.

[Step S13]

Figure 6:
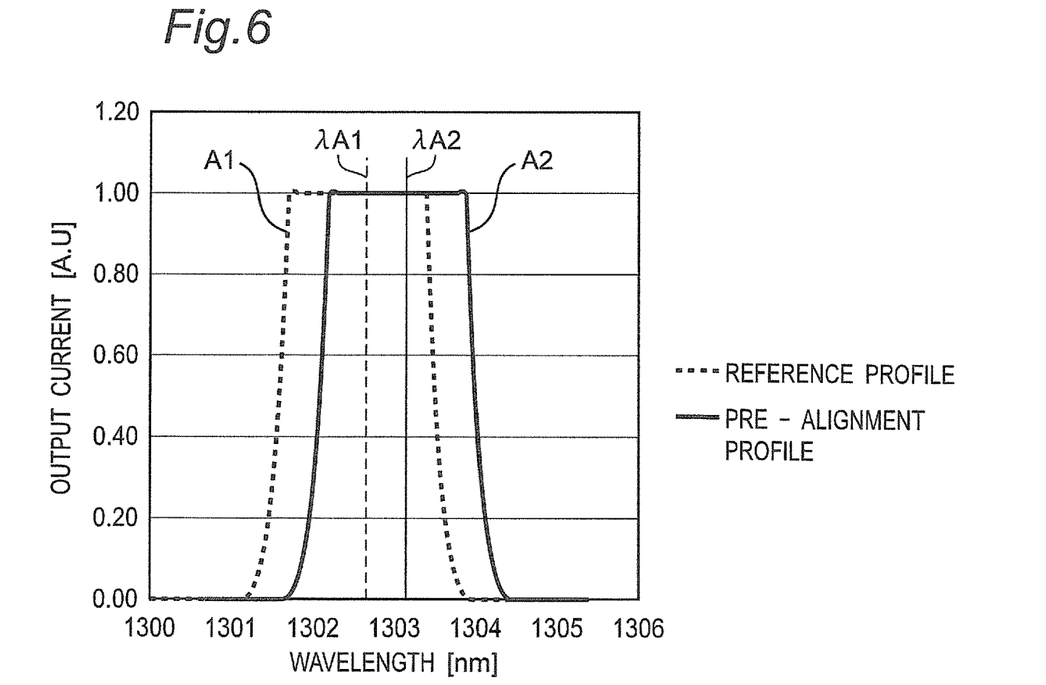
FIG. 6 is a graph showing a pre-alignment profile and a reference profile of the output current of the light receiving element according to the first embodiment of the present invention.

Based on a measurement result obtained in step S12, a deviation in the angle of the optical demultiplexer 40 in the horizontal direction (a direction parallel to the paper surface in FIG. 4) is calculated, and the angle of the optical demultiplexer 40 is adjusted. FIG. 6 is a graph showing the output current profile as in FIG. 5. In FIG. 6, a broken line A1 represents the reference profile in accordance with the design of the integrated optical module 4, and a solid line A2 represents an actually measured pre-alignment profile. The reference profile A1 represents an ideal relation between the output current value acquired by the light receiving element 41 and the wavelength of the light beam that has passed through the filter 44 located in front of the light receiving element 41.

In a step S13, the center wavelength of a profile is obtained for the two profiles A1 and A2. Here, center wavelengths of flat portions of the profiles A1 and A2 are defined as center wavelengths λA1 and λA2, but a maximum wavelength may be defined as the center wavelength, for example.

Next, deviations in the center wavelengths λA1 and λA2 from the design value of the filter 44 are calculated. From these deviations in the center wavelengths, a deviation in the wavelength band of the light beam that has passed through the filter 44 is calculated.

Figure 7:
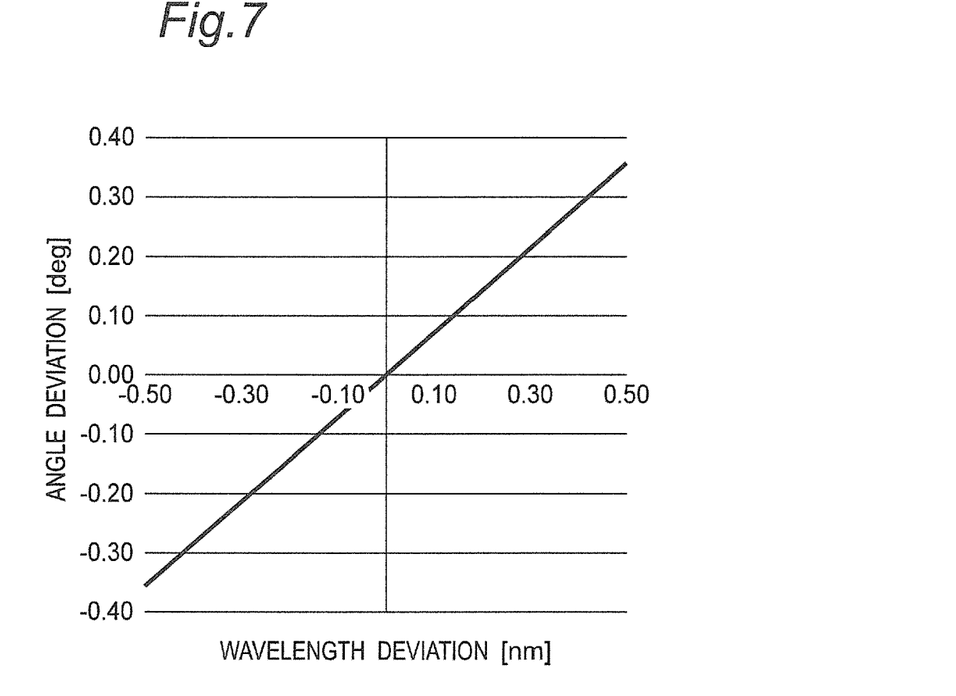
FIG. 7 is a graph showing a relation between a deviation in an optical axis angle and a deviation from a design value in a wavelength that passes through an optical demultiplexer according to the first embodiment of the present invention.

FIG. 7 is a graph showing a relation between a deviation in the center wavelength and a deviation in the incident angle with respect to the filter, in which the horizontal axis represents the deviation in the center wavelength and the vertical axis represents the deviation in the incident angle. The relation shown in FIG. 7 is acquired in advance. The relation between the deviation in the wavelength and the deviation in the angle acquired for the light beam passing through the four filters 44 is a linear relation and is represented by a linear line. From FIG. 7, the deviation in the incident angle with respect to the filter 44 corresponding to the deviation in the center wavelength is obtained.

Next, the angle of the optical demultiplexer 40 in the horizontal direction is adjusted to correct the deviation in the incident angle thus obtained. Specifically, the optical demultiplexer 40 gripped by the gripping means 12 of the adjustment mechanism 5 is rotated in a horizontal plane in accordance with the deviation in the incident angle obtained by the PC unit 9, and the angle in the horizontal direction is adjusted.

Figure 8:
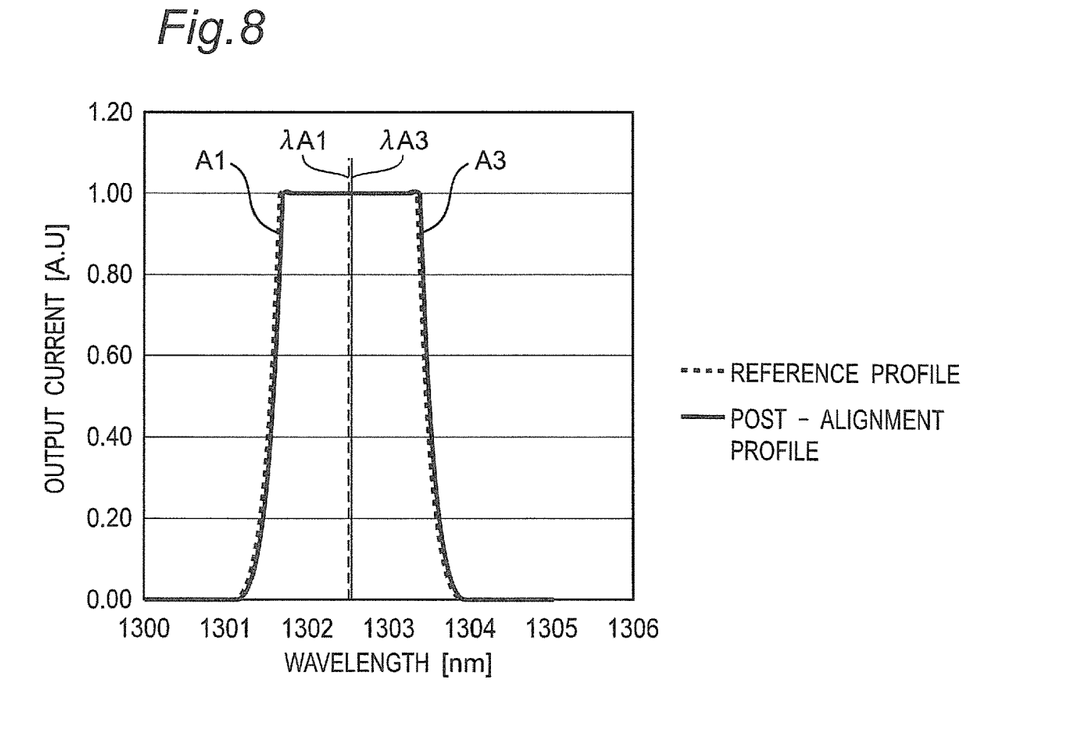
FIG. 8 is a graph showing a post-alignment profile and the reference profile of the output current of the light receiving element according to the first embodiment of the present invention.

FIG. 8 is a graph showing a post-alignment profile and reference profile of the output current of the light receiving element according to the first embodiment of the present invention, in which a solid line represents a post-alignment profile A3 after correcting the deviation in the incidence angle of the optical demultiplexer 40, and a dotted line represents a reference profile A1 that is the same as the profile shown in FIG. 6. As shown in FIG. 8, a center wavelength λA3 of the post-alignment profile A3 and a center wavelength λA1 of the reference profile A1 are very close to each other. As a difference from the center wavelength λA1 of the reference profile A1 approaches zero, it is considered that the optical axis adjustment has been performed with higher accuracy.

Figure 9:
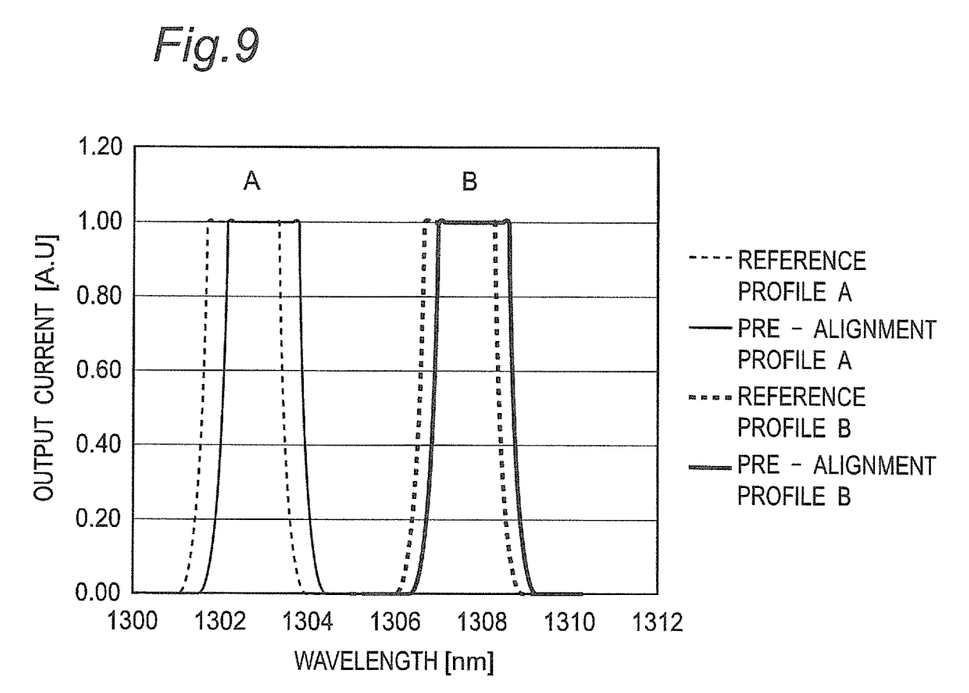
FIG. 9 is a graph showing pre-alignment profiles and reference profiles of output currents of two light receiving elements according to the first embodiment of the present invention.

Likewise, with the wavelength of the light beam supplied from the light source 1 changed, a deviation between the center wavelength of the reference profile and the center wavelength of the measured pre-alignment profile for a light beam that has passed through each of the filters 44a, 44b, 44c, and 44d is calculated. FIG. 9 shows reference profiles (broken line) and pre-alignment profiles (solid line) for two filters. FIG. 9 shows profiles for the two filters, but the different number of profiles may be shown simultaneously in accordance with the number of light receiving elements.

Figure 10:
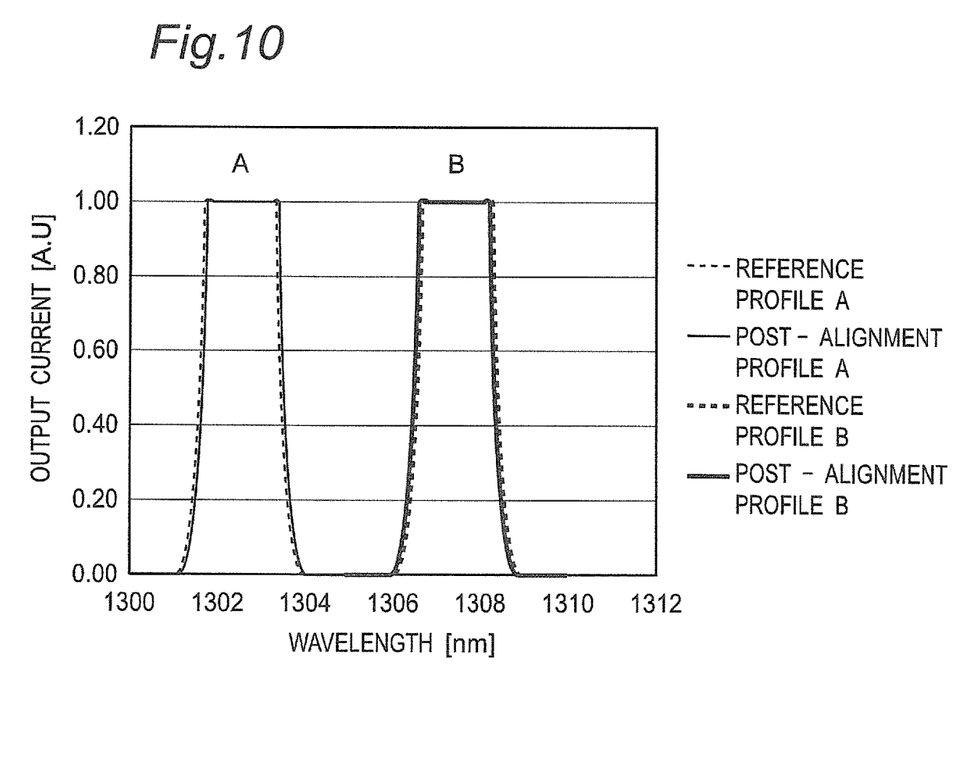
FIG. 10 is a graph showing post-alignment profiles and the reference profiles of the output currents of the two light receiving elements according to the first embodiment of the present invention.

For a plurality of profiles as well, deviations in respective center wavelengths are calculated using the relation shown in FIG. 7, and the angle of the optical demultiplexer 40 is adjusted based on the deviations. FIG. 10 shows the post-alignment profile (solid line) after correcting the deviation in the angle of the optical demultiplexer 40 and the reference profile (broken line) for the light beams that have passed through the two filters 44. For the light beams that have passed through the two filters, their respective deviations in the center wavelength are smaller.

Here, ideally, it is possible to correct all the filters by calculating the deviation in the angle of one filter and correcting the angle of the optical demultiplexer based on the deviation. However, in practice, angles at which the filters 44 are fixed to the main body 42 of the optical demultiplexer 40 vary; thus, even when the correction is made based on the deviation in the angle calculated based on one filter 44, optimal correction cannot be always performed on all the filters 44.

Therefore, in the first embodiment of the present invention, an angle correction amount is calculated so that a combination of angle deviations calculated from the output current profiles obtained from the plurality of filters 44 is minimized. More specifically, a method is used in which a deviation in the center wavelength of the whole integrated optical module is calculated using the least squares method for minimizing the sum of squares of deviation values with respect to deviations in the center wavelengths calculated for the plurality of light receiving elements 41, and the deviation in the angle of the optical demultiplexer 40 is calculated based on the deviation from FIG. 7.

As a result, it is possible to minimize, as a whole, a variation in shape between the output current profiles and reference profiles of the plurality of light receiving elements 41.

Note that the method of calculating the deviation in the center wavelength of the whole integrated optical module is not limited to the least squares method, but any method, such as the simple average method, may be used as long as the variation in shape between the output current profile and reference profile of each of the light receiving elements lies within the design range.

FIG. 10 shows a result obtained by calculating the deviation in the center wavelength of the whole integrated optical module using the least squares method and correcting, based on the deviation, the deviation in the angle of the optical demultiplexer 40, which shows that deviations of light beams that have passed through two filters are smaller.

As described above, conventionally, the deviation in the mounting angle of the optical demultiplexer 40 is corrected with respect to each of the light receiving elements 41, the optical axis adjustment is repeated by the number of light receiving elements 41, or the optical axis adjustment is performed on one light receiving element selected from the light receiving elements. In contrast, in the present invention, the optical axis adjustment can be performed so that the combination of the output current values of all the light receiving elements 41 is optimized. As a result, it is possible to shorten an adjustment time by reducing the number of times of the optical axis adjustment, and to perform the optical axis adjustment, with high accuracy, on a plurality of elements. Note that it is possible to shorten the adjustment time even with optical axis adjustment where the combination of the output current values of all the light receiving elements 41 is not optimized, but only a wavelength deviation of a first light receiving element is minimized or a total sum of wavelength deviations of the first light receiving element and a second light receiving element is minimized, and to perform the optical axis adjustment, with high accuracy, on a target element.

[Step S14]

In a step S14, the optical demultiplexer 40 on which the optical axis adjustment has been performed is bonded to the package 43 of the integrated optical module 4. In the bonding method, for example, the optical demultiplexer 40 on which the optical axis adjustment has been performed is moved outside of the package 43 first, and resin (ultraviolet curing resin) that is cured when being irradiated with ultraviolet rays is applied to a bottom of the optical demultiplexer 40. Subsequently, the optical demultiplexer 40 is returned to a position where the optical axis adjustment has been performed, the resin is irradiated with ultraviolet rays to be cured, and the optical demultiplexer 40 is fixed to the package 43 of the integrated optical module 4.

In step 14, coordinate data of the position and angle of the optical demultiplexer 40 after the optical axis adjustment is read from the adjustment mechanism 5 and stored in the PC unit for the optical demultiplexer 40 that is returned to the original position after being moved from the position where the optical axis adjustment is performed. After applying the resin, the optical demultiplexer 40 is returned to the original position based on the coordinate data thus stored and, in that state, the optical demultiplexer 40 is irradiated with ultraviolet rays to be fixed.

It is preferable to perform an inspection after bonding the optical demultiplexer 40 to the package 43 of the integrated optical module 4. In the inspection, as shown in FIG. 10, the output current profile shape of and reference profile shape of each of the light receiving elements 41 are compared, and the deviation in the mounting angle of the filter 44 is calculated again from the deviation in the center value of the wavelength band of the light beam that has passed through the filter 44, and a determination is made whether the deviation thus calculated lies within a product design range.

Through the above-described processes, the optical demultiplexer 40 is fixed into the package 43 with the optical axis of the optical demultiplexer 40 adjusted.

Second Embodiment

Figure 11:
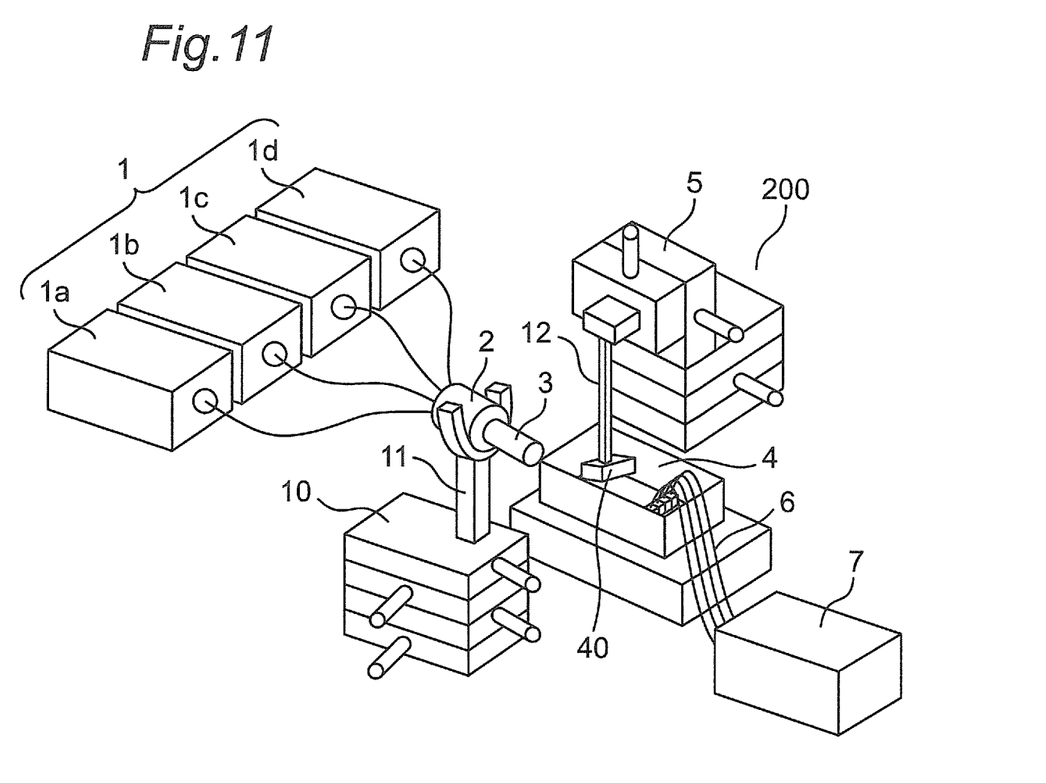
FIG. 11 is a perspective view of an optical axis adjustment device according to a second embodiment of the present invention.
Figure 12:
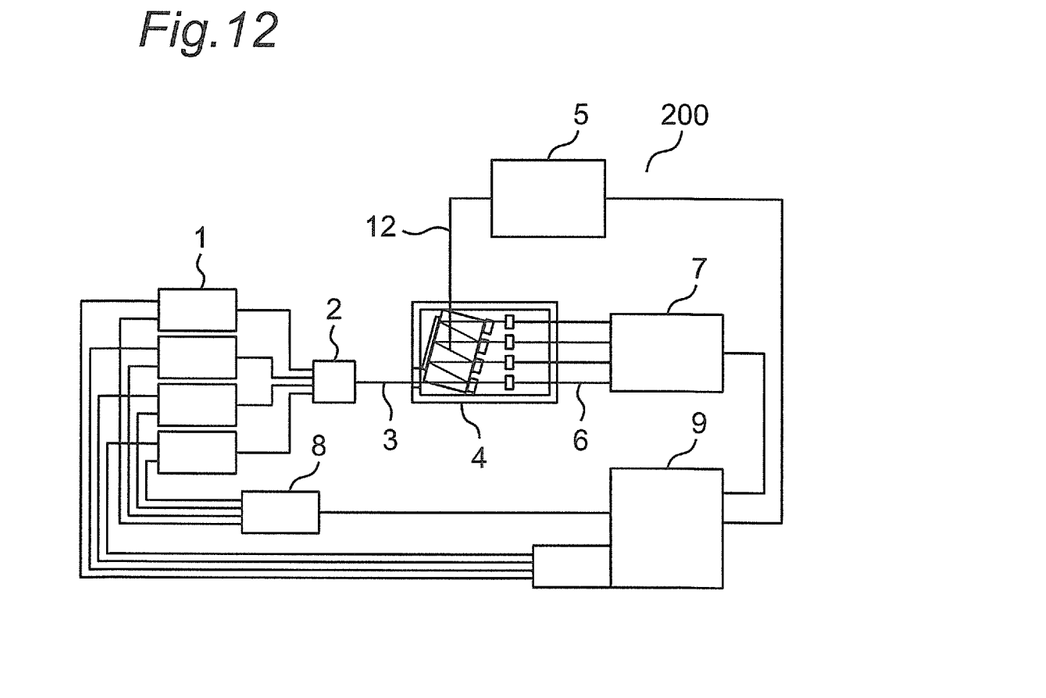
FIG. 12 is a block diagram showing a configuration of the optical axis adjustment device according to the second embodiment of the present invention.

FIG. 11 is a perspective view of an optical axis adjustment device according to a second embodiment of the present invention, the whole of which is denoted by 200. Further, FIG. 12 is a block diagram showing a configuration of the optical axis adjustment device 200. In FIGS. 11 and 12, the same reference numerals as the reference numerals in FIGS. 1 and 2 indicate the same or similar parts.

In the optical axis adjustment device 200 according to the second embodiment of the present invention, as the light source 1, a plurality of light sources $1a$, $1b$, $1c$, and $1d$ having different emission wavelengths is used, and light beams supplied from the light sources are multiplexed by an optical component 2 such as an optical multiplexer, and the resultant light beam enters the collimator 3. Other configurations are the same as the configurations of the optical axis adjustment device 100 according to the first embodiment shown in FIGS. 1 and 2.

That is, as shown in FIG. 11, the optical axis adjustment device 200 according to the second embodiment of the present invention includes the plurality of (four in FIG. 11) light sources 1 ($1a$, $1b$, $1c$, and $1d$) that change a wavelength of a light beam to be emitted, and the optical component (multiplexer) 2 that multiplexes the plurality of light beams emitted from the light sources 1, and a light beam resulted from multiplexing in the optical component 2 enters the collimator 3 via the optical fiber. The light beam that has passed through the collimator 3 enters the optical demultiplexer 40, is demultiplexed into light beams that each pass through a corresponding filter 44, and each the light beams enters a corresponding light receiving elements 41 and is detected. In FIGS. 11 and 12, the light beam that has entered the filters 44 is demultiplexed into four light beams having different wavelengths, and the four light beams are each detected by a corresponding light receiving element 41. The angle of the optical demultiplexer 40 is adjusted so that output current values detected by the plurality of light receiving elements 41 become optimum.

Figure 13:
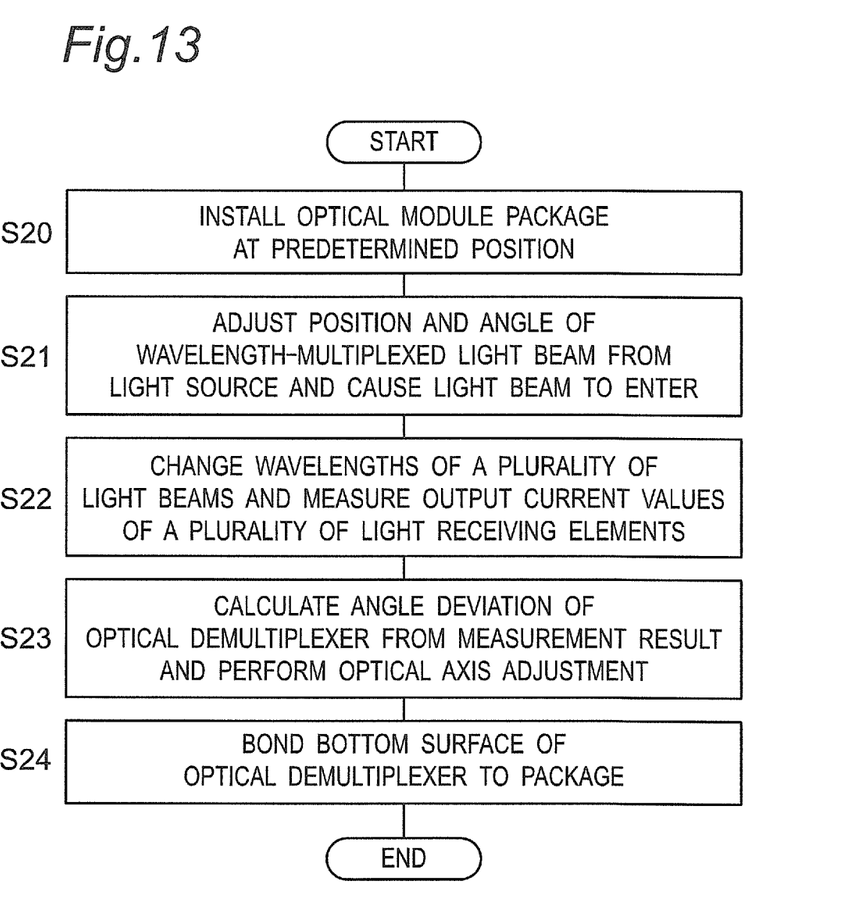
FIG. 13 is a flowchart showing a manufacturing process of an integrated optical module according to the second embodiment of the present invention.

Next, an optical axis adjustment method will be described with reference to FIG. 13. FIG. 13 is a flowchart showing the optical axis adjustment method according to the second embodiment of the present invention, and the optical axis adjustment method includes the following five steps S20 to S24.

[Step S20]

This process is the same as the process of step S10 according to the first embodiment in which the package 43 of the integrated optical module 4 is fixed onto the stage 20 of the optical axis adjustment device 200.

[Step S21]

The position and angle of the optical demultiplexer 40 gripped by the gripping means 12 are adjusted by the adjustment mechanism 5 so that the incident light beam that is resulted from multiplexing in the optical component 2 and has entered into the package 43 through the collimator 3 enters the optical demultiplexer 40. In the optical axis adjustment device 200, the plurality of light sources having different wavelengths is used as the light source 1, and light beams having different wavelengths supplied from the plurality of light sources are multiplexed by the optical component 2 and enter the collimator 3. In FIG. 12, each of the wavelengths of the light beams obtained from the four light sources corresponds to the wavelength of the light beam received by a corresponding one of the four light receiving elements through a corresponding one of the filters 44 provided in the optical demultiplexer 40. The other processes are the same as the processes in step S11 of the first embodiment.

[Step S22]

The respective wavelengths included in the light beams are changed, and a change in the output current is detected by each light receiving element 41. For example, when the wavelengths of the light sources 1a, 1b, 1c, and 1d are denoted by $\lambda a$, $\lambda b$, $\lambda c$, and $\lambda d$, respectively, the wavelengths to be changed need only be in the vicinity of $\lambda a$, $\lambda b$, $\lambda c$, and $\lambda d$. It is also possible to simultaneously change four different wavelengths.

The other processes are the same as the processes in step S12 of the first embodiment, which allows the relation between the reference profile and the pre-alignment profile as shown in FIG. 6 to be obtained for the light beam received by each of the light receiving elements 41, and allows the deviation angle of each of the filters 44 to be obtained from the graph shown in FIG. 7. Then, for all the filters 44, the rotation angle of the optical demultiplexer is calculated using, for example, the least squares method so that the deviation angle is optimized.

[Step S24]

As in step S14 according to the first embodiment, the optical demultiplexer 40 is fixed at a predetermined position of the package 43, and then an inspection process is performed.

Through the above-described processes, the optical demultiplexer 40 is fixed into the package 43 with the optical axis of the optical demultiplexer 40 adjusted.

In the optical axis adjustment method according to the second embodiment of the present invention, the wavelengths of the light beams having different wavelengths supplied from the plurality of light sources 1a, 1b, 1c, and 1d can be changed only in the vicinity of wavelengths that can transmit through the respective filters and measurement of an output signal in the light receiving element can be performed in a short time. Further, since light beams having a plurality of wavelengths are used, it is possible to simultaneously measure the output signals in the plurality of light receiving elements, which shortens the measurement time.

Third Embodiment

Figure 14:
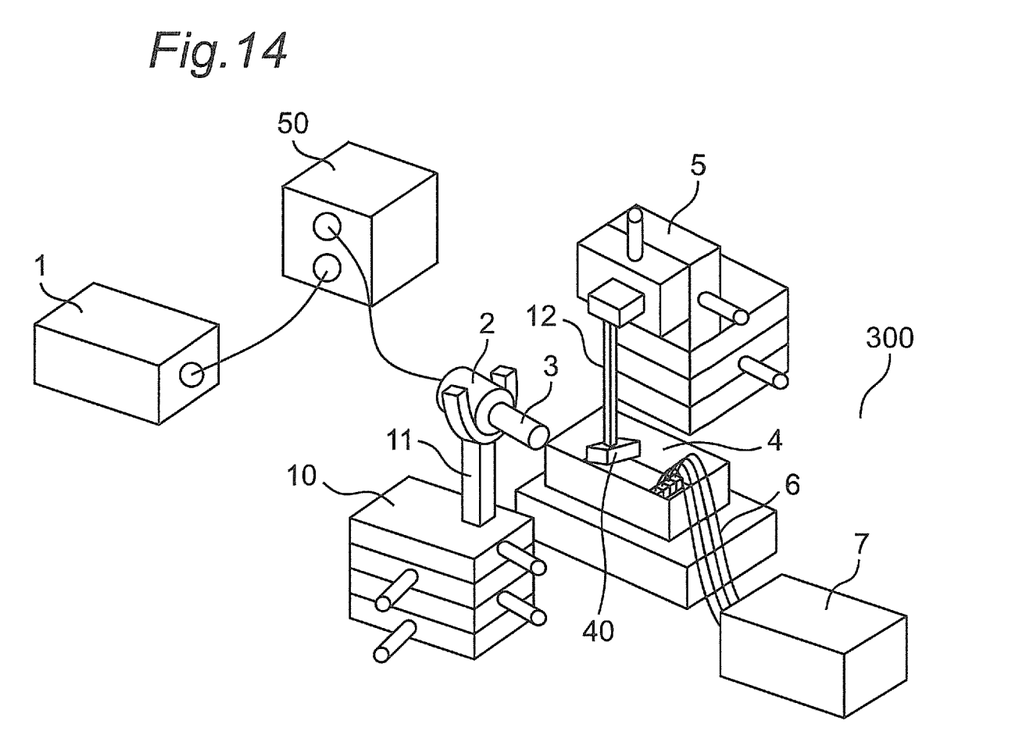
FIG. 14 is a perspective view of an optical axis adjustment device according to a third embodiment of the present invention.
Figure 15:
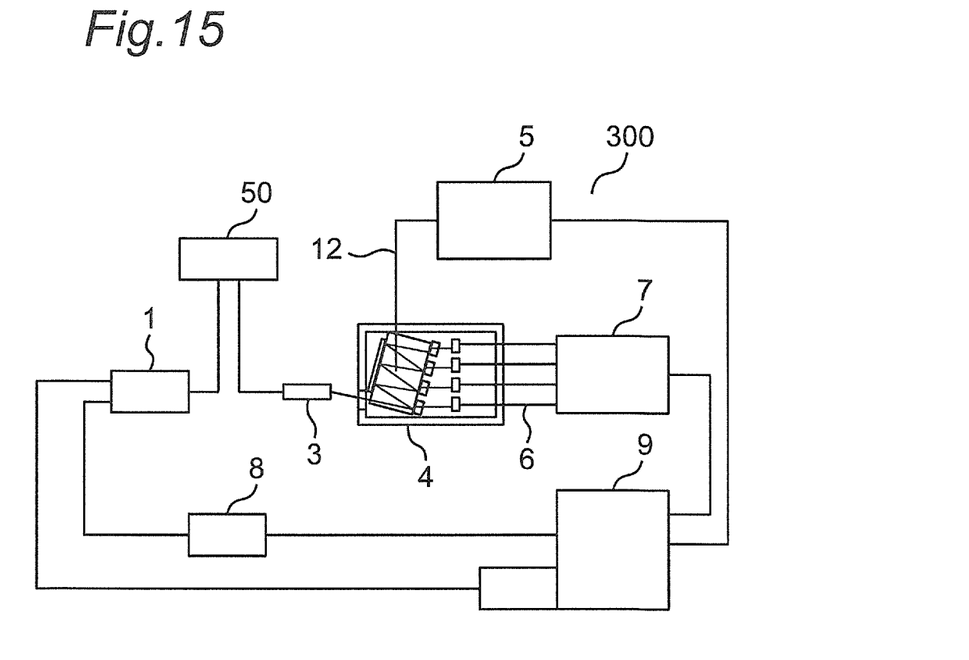
FIG. 15 is a block diagram showing a configuration of the optical axis adjustment device according to the third embodiment of the present invention.
Figure 16:
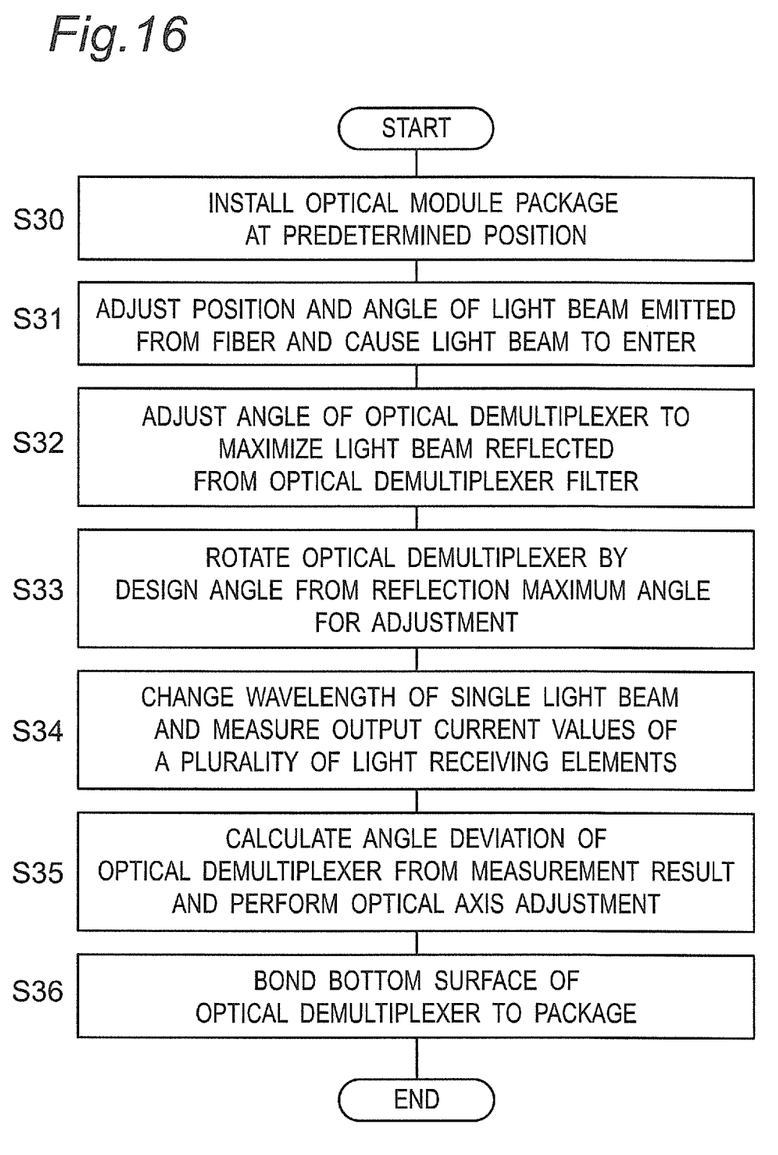
FIG. 16 is a flowchart showing a manufacturing process of an integrated optical module according to the third embodiment of the present invention.
Figure 17:
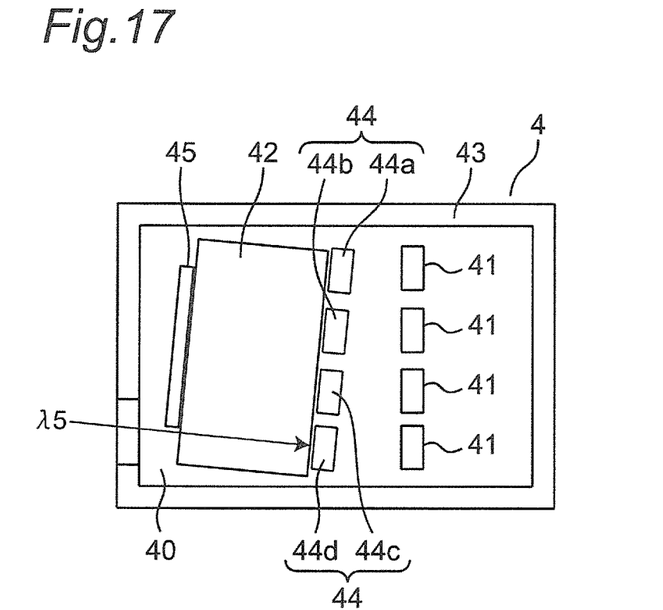
FIG. 17 is a plan view showing an installation angle of an optical demultiplexer according to the third embodiment of the present invention in a case where a light beam emitted from a fiber is reflected most in the optical demultiplexer.

FIG. 14 is a perspective view of an optical axis adjustment device according to a third embodiment of the present invention, the whole of which is denoted by 300, and FIG. 15 is a block diagram showing a configuration of the optical axis adjustment device 300. FIG. 16 is a flowchart showing an optical axis adjustment method for an integrated optical module according to the third embodiment of the present invention, and FIG. 17 is a plan view of the integrated optical module. In FIGS. 14, 15, and 17, the same reference numerals as the reference numerals in FIGS. 1, 2, and 4 indicate the same or similar parts.

In the optical axis adjustment device 300 according to the third embodiment of the present invention, a light beam supplied from the light source 1 enters the collimator 3 via a reflected return light measurement device 50. Other configurations are the same as the configurations of the optical axis adjustment device 100 according to the first embodiment shown in FIGS. 1 and 2.

That is, as shown in FIG. 14, in the optical axis adjustment device 300 according to the third embodiment of the present invention, the light beam emitted from the light source 1 that changes a wavelength of a light beam to be emitted enters the collimator 3 via the reflected return light measurement device 50. The light beam that has passed through the collimator 3 via the reflected return light measurement device 50 enters the optical demultiplexer 40. Further, a light beam reflected by the filter 44 of the optical demultiplexer 40 is detected by the reflected return light measurement device 50 via the collimator 3. After detecting an installation angle of the optical demultiplexer 40 that minimizes an optical loss due to reflection, the optical demultiplexer 40 is relatively moved with a center of the optical demultiplexer main body 42 as a rotation axis so that the optical demultiplexer 40 is positioned at a design installation angle. The collimator 3 is also moved by the adjustment mechanism 10 by an amount of relative movement of the filter 44 caused by the rotation to offset an optical axis deviation. As a final adjustment, the angle of the optical demultiplexer 40 is adjusted so that the output current values detected by the plurality of light receiving elements 41 are optimized.

Next, an optical axis adjustment method will be described with reference to FIG. 16. FIG. 16 is a flowchart showing the optical axis adjustment method according to the third embodiment of the present invention, and the optical axis adjustment method includes the following seven steps S30 to S36.

[Step S30]

This process is the same as the process of step S10 according to the first embodiment in which the package 43 of the integrated optical module 4 is fixed onto the stage 20 of the optical axis adjustment device 300.

[Step S31]

The same process as the process of step S11 of the first embodiment is performed in which the position and angle of the collimator 3 are adjusted by the adjustment mechanism 10, and then the position of the collimator 3 is adjusted so that an optical axis position deviation is offset by refraction in the optical demultiplexer main body 42. Further, the position and angle of the optical demultiplexer 40 gripped by the gripping means 12 are adjusted by the adjustment mechanism 5 so that the incident light beam that has entered into the package 43 through the collimator 3 via the reflected return light measurement device 50 enters the optical demultiplexer 40.

[Step S32]

Figure 18:
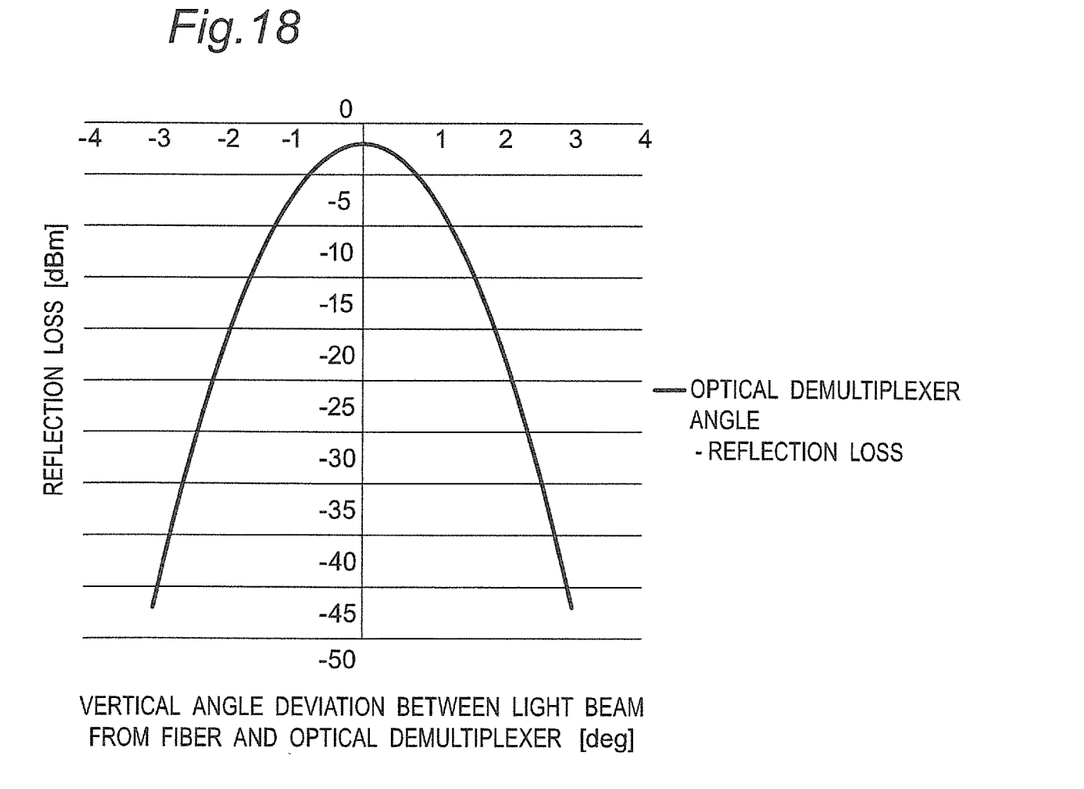
FIG. 18 is a graph showing the angle of the optical demultiplexer according to the third embodiment of the present invention and an optical loss when the light beam that is emitted from the fiber is reflected by the filter of the optical demultiplexer.

As shown in FIG. 17, the light beam that is emitted from the light source 1 and enters the filter 44d of the optical demultiplexer 40 through the collimator 3 via the reflected return light measurement device 50 is reflected by the filter 44d and passes through the collimator 3, and then an optical loss is detected by the reflected return light measurement device 50. From the optical loss thus detected and the graph of FIG. 18 showing the angle of the optical demultiplexer and the optical loss of the reflected light, an angle at which the optical demultiplexer 40 is perpendicular to the incident light beam and the optical loss becomes smallest is obtained.

[Step S33]

As shown in FIG. 17, the optical demultiplexer 40 is relatively rotated, with the center of the main body 42 as the rotation axis, by the design installation angle from the reference angle at which the optical loss becomes smallest, and the collimator 3 is also moved by the amount of relative movement of the filter 44 caused by the rotation to offset the optical axis deviation.

For example, the optical axis deviation caused by rotation of the main body 42 by the design installation angle of 7 degrees is 200 µm in the horizontal direction; thus, the filter 44 is moved by 200 µm in the horizontal direction to eliminate the optical axis deviation.

[Step S34]

This process is the same as the process of step S12 according to the first embodiment in which wavelengths included in the light beam are changed, and a change in the output current in each of the light receiving elements 41 is detected.

[Step S35]

This process is the same as the process of step S13 according to the first embodiment in which the relation between the reference profile and the pre-alignment profile as shown in FIG. 6 is obtained for the light beam acquired by each of the light receiving elements 41, and, from the graph of FIG. 7, the deviation angle of each of the filters 44 is obtained. Then, for all the filters 44, the rotation angle of the optical demultiplexer is calculated using, for example, the least squares method so that the deviation angle is optimized.

[Step S36]

As in step S14 according to the first embodiment, the optical demultiplexer 40 is fixed at a predetermined position of the package 43, and then an inspection process is performed.

Through the above-described processes, the optical demultiplexer 40 is fixed into the package 43 with the optical axis of the optical demultiplexer 40 adjusted.

In the optical axis adjustment method according to the third embodiment of the present invention, with reference to the angle of the optical demultiplexer at which the optical loss of a light beam that is supplied from the light source 1 and reflected by the filter 44d of the optical demultiplexer 40 becomes smallest, it is possible to perform adjustment to the design installation angle close to an alignment completion angle, and the subsequent calculation of the wavelength deviation through the measurement of the output signal in the light receiving element can be performed in a short time by shortening a wavelength change width of the incident light beam.

DESCRIPTION OF REFERENCE SYMBOLS

1 LIGHT SOURCE
2 OPTICAL COMPONENT
3 COLLIMATOR
4 INTEGRATED OPTICAL MODULE
5 ADJUSTMENT MECHANISM
6 WIRE
7 CURRENT MEASUREMENT INSTRUMENT
8 MEASUREMENT INSTRUMENT
9 PC UNIT
10 ADJUSTMENT MECHANISM
11, 12 GRIPPING MEANS
40 OPTICAL DEMULTIPLEXER
41 LIGHT RECEIVING ELEMENT
42 MAIN BODY
43 PACKAGE
44 FILTER
45 REFLECTOR
50 REFLECTED RETURN LIGHT MEASUREMENT DEVICE
100, 200, 300 OPTICAL AXIS ADJUSTMENT DEVICE

The invention claimed is:

1. An optical axis adjustment method for an integrated optical module including, in a package, an optical demultiplexer that demultiplexes an incident light beam into at least a first light beam and a second light beam that have different wavelengths, and at least a first light receiving element and a second light receiving element that receive the first light beam and the second light beam, respectively, the first light beam being suitable for a wavelength band of a light beam to be received by the first light receiving element, the second light beam being suitable for a wavelength band of a light beam to be received by the second light receiving element, the optical axis adjustment method comprising steps of:

measuring output currents by changing a wavelength of the incident light beam introduced into the package and detecting, with the first light receiving element and the second light receiving element, light beams resulted from demultiplexing the incident light beam with a first filter and a second filter;

detecting center wavelengths of the first light beam and the second light beam based on a change in the output currents in response to a change in the wavelength of the incident light beam;

comparing the center wavelengths of the first light beam and the second light beam with design transmission wavelengths of the first filter and the second filter, and defining respective differences as a first wavelength deviation and a second wavelength deviation; and adjusting a position of the optical demultiplexer so that the total sun of the first wavelength deviation and the second wavelength deviation lies within the design range.

2. The optical axis adjustment method according to claim 1, wherein the incident light beam is a light beam having a single wavelength that is allowed to be changed, and the measuring step is a step of changing the wavelength of the incident light beam in a wavelength range including the first wavelength and the second wavelength.

3. The optical axis adjustment method according to claim 1, wherein the incident light beam includes a light beam having a first wavelength and a light beam having a second wavelength, and the measuring step is a step of changing the wavelength of the incident light beam in each of a wavelength range including the first wavelength and a wavelength range including the second wavelength.

4. The optical axis adjustment method according to claim 1, wherein the incident light beam is a light beam that is allowed to be changed to a wavelength in a wavelength band other than a first wavelength band, and the measuring step is a step of detecting a light beam reflected from the first filter of the optical demultiplexer and adjusting an angle of the optical demultiplexer to a design angle based on an angle perpendicular to the incident light beam.

5. The optical axis adjustment method according to claim 3, wherein
the step of changing the first wavelength of the light beam in the wavelength range including the first wavelength and the step of changing the second wavelength of the light beam in the wavelength range including the second wavelength are performed simultaneously.

6. The optical axis adjustment method according to claim 1, wherein the adjusting step is a step of adjusting the position of the optical demultiplexer to minimize a sum of squares of values of the first wavelength deviation and the second wavelength deviation.

7. The optical axis adjustment method according to claim 1, wherein the adjusting step is a step of rotating the optical demultiplexer about an axis perpendicular to a bottom surface of the package to which the light receiving elements are fixed.

8. A manufacturing method for an integrated optical module, comprising a step of, after the optical axis adjustment according to claim 1, bonding the optical demultiplexer to the package at a position where the optical axis adjustment has been performed.

9. The manufacturing method for an integrated optical module according to claim 8, wherein
the bonding step is a step of applying ultraviolet curing resin between the optical demultiplexer and a bottom surface of the package and irradiating the ultraviolet curing resin with ultraviolet rays to cure the ultraviolet curing resin.

10. An optical axis adjustment device for an integrated optical module including, in a package, an optical demultiplexer that demultiplexes an incident light beam into a first light beam and a second light beam that have different wavelengths, and a first light receiving element and a second light receiving element that receive the first light beam and the second light beam, respectively, the optical axis adjustment device comprising:
a stage on which the package with the first light receiving element and the second light receiving element mounted on the package is placed and fixed;
a gripping means that grips, into the package, the optical demultiplexer including a first filter and a second filter;
a light source that supplies the incident light beam;
a current measurement instrument that detects the first light beam and the second light beam with the first light receiving element and the second light receiving element and acquires output currents from the detected light beams; and
a PC unit that detects center wavelengths of the first light beam and the second light beam based on a wavelength of the incident light beam and the output currents, compares the center wavelengths of the first light beam and the second light beam with design transmission wavelengths of the first filter and the second filter, defines respective differences as a first wavelength deviation and a second wavelength deviation, and calculates a position of the optical demultiplexer to make a total sum of the first wavelength deviation and the second wavelength deviation small,
wherein the gripping means moves the optical demultiplexer based on a calculation result of the PC unit.

11. The optical axis adjustment device according to claim 10, wherein the light source includes a first light source and a second light source that supply light beams having different wavelengths.

* * * * *